March 30, 1965     D. J. VANDER SCHAAF     3,175,676
TILTING HOPPER ELEVATOR
Filed July 1, 1963     2 Sheets-Sheet 1
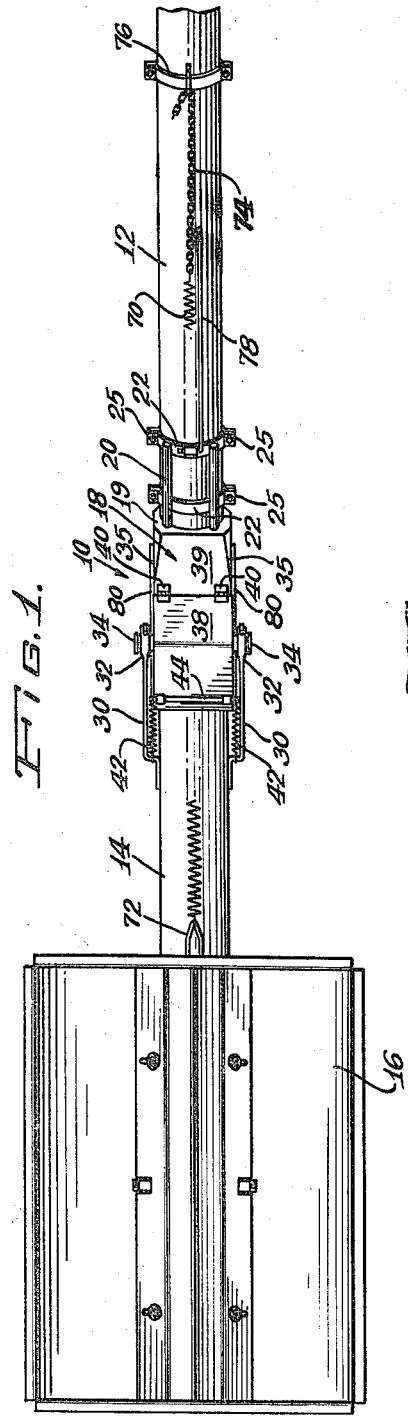
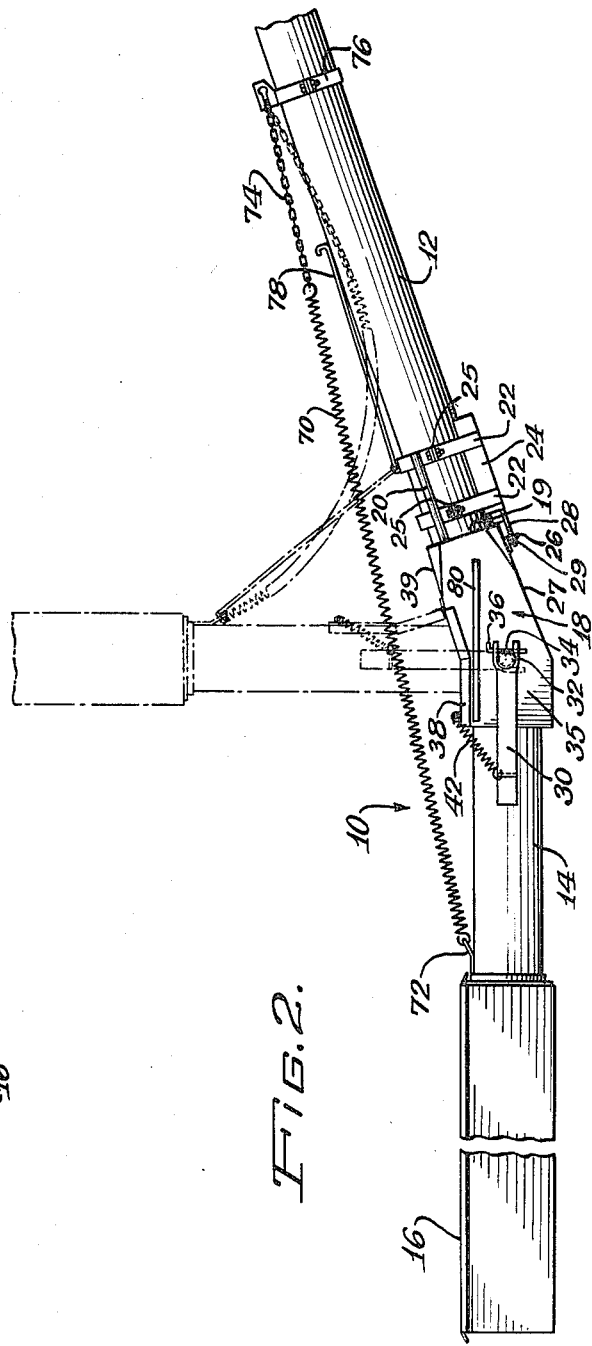
Inventor:
Douwie J. Vander Schaaf
By Bair, Freeman
& Molinare   Attys.

March 30, 1965 D. J. VANDER SCHAAF 3,175,676
TILTING HOPPER ELEVATOR

Filed July 1, 1963 2 Sheets-Sheet 2

Inventor:
Douwie J. Vander Schaaf
By Bair, Freeman
& Molinare Attys.

United States Patent Office 3,175,676
Patented Mar. 30, 1965

3,175,676
TILTING HOPPER ELEVATOR
Douwie J. Vander Schaaf, Hull, Iowa, assignor to Sioux Steel Company, Sioux Falls, S. Dak., a corporation of Delaware
Filed July 1, 1963, Ser. No. 291,705
9 Claims. (Cl. 198—114)

This invention relates to an auger type conveyor or elevator having a tiltable section and it particularly relates to an auger type conveyor having a tiltable hopper or drag section which may be pivoted to a substantially vertical position.

In the use of auger type elevators or conveyors for transferring grain or the like from the ground upwardly to a storage area, the hopper section ordinarily lies in a substantially horizontal position on the ground. The grain is dumped into the hopper and is moved by augers through the hopper section and is directed upwardly through the upwardly inclined elevator section. Since the drag or hopper section lies in a horizontal plane, it is often positioned across a road or across the entrance of a barn or grain storage structure or may otherwise block the desired path of a vehicle. Also, it is sometimes difficult to adjust the location of a truck or vehicle containing grain for loading into the hopper because the hopper's position on the ground hampers the manueverability of the vehicle. For these reasons, it would be highly advantageous if it would be possible to provide an auger type conveyor having a tiltable hopper or drag section which may be moved from a substantially horizontal position to a substantially vertical position. Therefore, it is a primary object of this invention to provide an auger type conveyor or elevator for grain or the like, wherein a tiltable hopper section is provided for allowing movement of the hopper section from a substantially horizontal position to a substantially vertical position.

It is a further object of this invention to provide a rigid junction member for enclosing the space between the elevator auger section and the hopper auger section and which is adapted to permit an upward pivoting movement of the hopper section.

It is also an object of this invention to provide an auger type conveyor or elevator having a tiltable hopper section wherein the junction member, provided for enclosing the space between the hopper auger tube and the elevator auger tube, includes a lid or cover which is hingedly attached to the top of the junction member and is biased into contact with the uppermost portion of the hopper auger section in order to substantially prevent the loss of grain and to protect the grain from dirt and other contamination.

It is another object of this invention to provide an auger type elevator or conveyor having a tiltable hopper section which is enclosed by a junction box, wherein a flexible boot is provided for substantially preventing the loss of grain and also for preventing contamination of the grain.

Further purposes and objects of this invention will appear as the specification proceeds.

A particular embodiment of the present invention is illustrated in the accompanying drawings wherein:

FIGURE 1 is a top plan view of an auger conveyor with a tiltable hopper section;

FIGURE 2 is a side elevational view of the embodiment of FIGURE 1;

Figure 3:
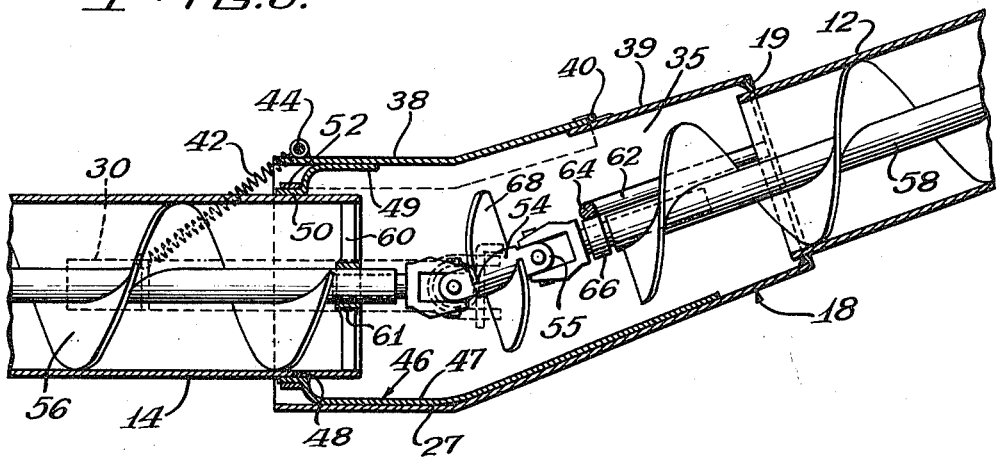
FIGURE 3 is an enlarged, partially sectioned view of the auger tubes and the junction box enclosing the space between the auger tubes, while in the operating position.

Referring to the drawings, the tilting auger type conveyor, generally indicated as 10, is provided with both an elevator auger tube 12, which is upwardly inclined for lifting grain or other material through the tube, and a hopper auger tube 14 which normally lies in a substantially horizontal position. Each of the auger tubes are generally circular in cross-section, so as to accommodate augers 56 and 58. The pivotable end of the auger tube 14 is provided with a hopper 16 for receiving a quantity of grain for conveying through the tubes 12 and 14. The hopper 16 is secured to the tube 14 by any suitable means, as by the use of suitable fasteners or clamps.

A junction box or member 18 is provided for substantially enclosing the space between the auger tubes 12 and 14. The junction box 18 is made of a rigid metallic material, such as steel, and is non-circular in cross section, preferably substantially square.

The elevator auger tube 12 is secured to and passes through the end wall 19 of the junction box 18. As shown, a pair of extension rods 20 may be welded to the wall 19 of the junction box 18 and also to the upper sections of the two clamps 22. The lower sections of the clamps 22 may pass around the reinforcing bar 24 at the underside of the tube 12 so that both clamps 22 are adapted to encompass the outer periphery of the auger tube 12. Upon securement of the clamps 22 at the flanges 25 by nuts and bolts, the junction box 18 is secured to the elevator auger tube 12. Assisting in securing the tube 12 to the junction box 18 is an angle iron 26 which is welded to the bottom 27 of the junction box 18; the angle iron 26 is provided with openings through which bolts 28, passing from the reinforcing bar 24, may be inserted and tightened thereto by means of nuts 29.

The auger tube 14 for the hopper 16 is pivotably mounted on the junction box 18. Specifically, a pair of mounting bars 30 are welded to diametrically opposite sides of the auger tube 14 in substantial horizontal alignment. The ends of the mounting bars 30 are each provided with a clevis 32; each clevis 32 straddles a pivot bar or rod 34 which is welded to each lateral side wall 35 of the junction box 18. Each clevis 32 is held hingedly connected to the pivot rod 34 by means of a pin 36 which passes through each clevis 32. Thus, the hopper auger tube 14 is manually pivotable from a substantially horizontal position to a substantially vertical position, with respect to the elevator auger tube 12, so that trucks or other vehicles may pass the area which would normally be blocked by hopper 16 and tube section 14.

In the construction of the junction box 18, it is important that a channel-shaped lid or cover 38 be provided for pivotable mounting to the fixed upper wall 39 of the junction box 18 by means of a hinge 40. The lid 38 is pivotable in unison with the pivoting of the tube 14, that is, it is pivotable about a substantially horizontal axis. In order to bias the lid 38 against or towards the uppermost portion of the auger tube 14, springs 42 are provided. One end of each spring 42 is connected to the mounting bar 30 near the point of attachment of the bar 30 to the tube 14; the opposite end is connected to a rod 44 which is fixed to the upper surface of the free end of the channel-shaped lid 38. Thus, upon upward rotation of the tube 14, the lid 38 also pivots upwardly and is maintained against the tube 14 by the springs 42. The lid 38 assists in substantially preventing the egress of grain and the ingress of contamination at the junction box 18 since it is maintained in close proximity to the tube 14 at all times.

Figure 4:
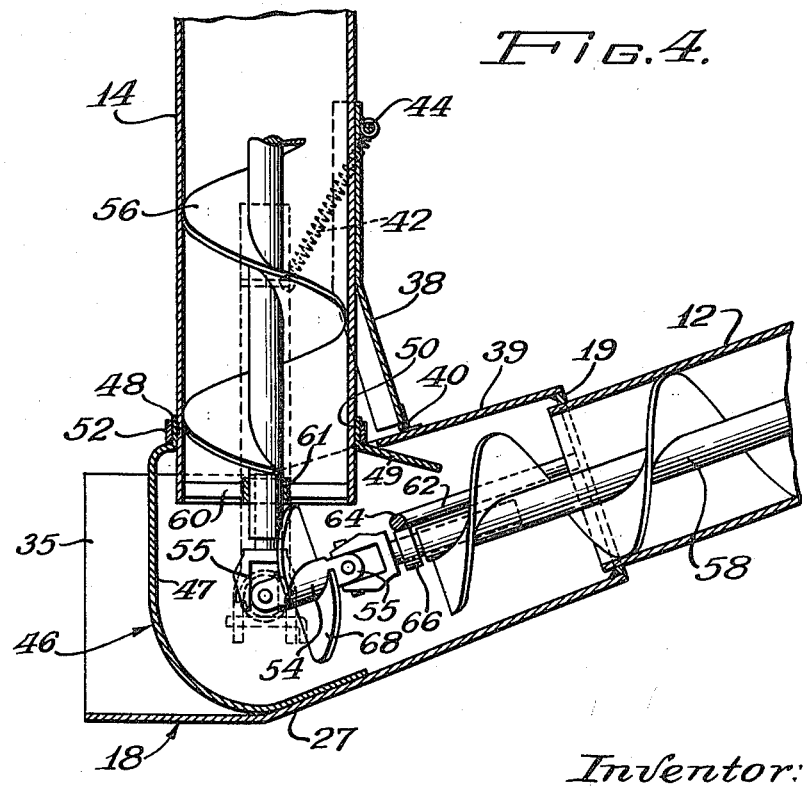
FIGURE 4 is a view similar to FIGURE 3 except the hopper or drag section is shown in the raised position.

Also, provided for sealing the junction box 18 is a flexible flat sheet or boot 46 which is provided with an opening 48, having a collar 50 positioned therearound. The auger tube 14 is inserted through the opening 48 and a clamp 52 is tightened around the collar 50 for maintaining the boot 46 firmly connected to the tube 14. As shown best in FIGURES 3 and 4, the flexible boot 46 has a substantially longer lower portion 47 than an upper portion 49; the longer lower portion 49 is required since the space between the auger tube 14 and the inner surfaces of the junction box 18 increases as the tube 14 is pivoted to the vertical position. Thus the boot 46 along with the hinged lid 38 cooperate to substantially prevent the loss of grain at the junction box 18 and to substantially prevent the entrance of dirt or other contamination into the junction box 18.

The lateral edges of the flexible boot 46 are adapted to be maintained in substantial contact with the inner surfaces of the lateral walls 35 of the junction box 18; the upper portion 49 of the boot 46 is adapted to substantially seal either the inner surface of the lid 38 or the upper wall 39 of the junction box 18; and the lower portion 47 of the boot 46 is adapted to substantially seal the inner surface of the bottom 27 of the junction box 18. The boot 46 may be constructed of a heavy belting material which is somewhat rigid, but yet flexible. Springable metal strips (not shown) may be riveted to the edges of the boot 46 so as to provide positive contact with the inner surfaces of the junction box 18. The collar 50 may be made of leather and sewn on the boot 46.

Positioned within the junction box 18 is a double knuckle impeller 54 which cooperates with the universal joints 55 for operatively connecting the delivering auger 56 to the receiving auger 58. The impeller 54 and the universal joints 55 enable both augers 56 and 58 to be rotated simulaneously, despite the particular angular relationship between the augers.

The delivery auger 56 is rotatably mounted centrally of the auger tube 14 by means of a spider 60, fixed within the tube 14, which carries a bearing 61 through which the auger shaft 57 passes. The receiving auger 58 is rotatably mounted within the junction box 18 and is centrally supported therein by means of a pair of support arms 62 extending along the inside of the lateral walls 35 of the junction box 18. A cross bar 64 passes between and is fixed to the support arms 62; the cross bar 64 carries a journal bearing 66 which allows rotation of the auger 58. Also to be noted, flights 68 are provided on the impeller 54 so that grain is positively moved from the auger tube 14 to the auger tube 12 through the junction box 18.

Preferably a counterbalance spring 70 is provided for assisting the upward pivoting movement of the hopper 16 and hopper auger tube 14. One end of the counter balance spring 70 is connected to a bracket 72 adjacent to the hopper 16 and the opposite end of the spring 70 is connected to a chain 74. The chain 74 is in turn connected to an adjustable clamp 76 which may be moved along the elevator auger tube 12 in order to adjust the desired tension for the spring 70. Thus, as the tube 14 and hopper 16 are manually pivoted upwardly, the spring 70, which biases the auger tube 14 towards the elevator auger tube 12, assists the operator in moving the hopper 16 and tube 14 to a substantially vertical position.

Also, a holder arm 78 is provided for maintaining the hopper 16 and tube 14 in the substantially vertical position; the arm 78 is pivotably mounted on the elevator auger tube 12 and is provided with a hooked free end which is adapted to engage the bracket 72 provided adjacent the hopper 16. Also, stiffener bars 80 are secured to the lateral side walls 35 of the junction box 18 in order to substantially avoid buckling of the side walls 35.

It is thus seen that all of the aforementioned objects have been accomplished by the described tiltable conveyor. The hopper 16 and the auger tube 14 may be readily tilted upwardly out of the path through which a vehicle may pass, merely by manually pivoting the auger tube 14 and the hopper 16 upwardly, about the pivot rods 34, the counterbalance spring 70 assisting in the upward movement. By providing the hinged and biased lid 38, this movement is possible. Also, the hinged lid 38 and the boot 46 cooperate to substantially prevent the loss of grain at the junction box 18 and also to prevent the contamination from passing into the junction box 18.

While in the foregoing there has been a detailed description of a particular embodiment of the present invention, it is to be understood that all equivalents obvious to those having skill in the art are to be included within the scope of the invention as claimed.

What I claim and desire to secure by Letters Patent is:

1. An auger type conveyor having a tiltable section, said conveyor comprising a first auger tube, a second auger tube spaced from said first auger tube, a rigid junction member secured to said first auger tube for substantially enclosing the space between said first and second auger tubes, said second auger tube being mounted on said junction member for pivotable movement about a substantially horizontal axis, a lid hingedly attached to said junction member for pivotable movement about a horizontal axis, means for biasing said lid towards the uppermost portion of said auger tube for directing said lid into close proximity with said second auger tube regardless of the particular pivoted position of said second auger tube, and a flexible boot secured to said second auger tube for substantially enclosing the space between said second auger tube and said junction member.

2. An auger type conveyor having a tiltable section, said conveyor comprising a first auger tube, a second auger tube spaced from one end of said first auger tube, a hopper fixed to the other end of said second auger tube, a rigid junction box secured to said first auger tube, a lid for said junction box, said junction box and said lid being adapted to substantially enclose the space between said first and second auger tubes, said second auger tube being mounted on said junction member for pivotable movement about a substantially horizontal axis whereby said second auger tube is adapted to move from a substantially horizontal position to a substantially vertical position, augers contained within said first and second auger tubes and being operatively connected together within said junction box, springs for biasing said lid towards the uppermost portion of said second auger tube for directing said lid into close proximity with said second auger tube regardless of the pivoted position of said second auger tube, means for assisting the pivotable movement of said second auger tube from a substantially horizontal position to a substantially vertical position, and a flexible boot secured to said second auger tube for substantially enclosing the space between said second auger tube and said junction box.

3. The conveyor of claim 2 wherein the means for assisting the pivotable movement of said second auger tube comprises a counterbalance spring having one end connected to said first auger tube and the other end connected to said second auger tube and being adapted to bias said second auger tube towards said first auger tube.

4. The conveyor of claim 3 wherein means are provided for maintaining said second auger tube and said hopper in a substantially vertical position.

5. An auger type conveyor having a tiltable section, said conveyor comprising a first auger tube, a second auger tube spaced from said first auger tube, a rigid junction member secured to said first auger tube for substantially enclosing the space between said first and second auger tubes, said second auger tube being mounted on said junction member for pivotable movement about a substantially horizontal axis, a lid for said junction member, and means for biasing said lid towards the uppermost portion of said second auger tube for directing said lid into close proximity therewith regardless of the particular pivoted position of said second auger tube relative to said junction member.

6. The conveyor of claim 5 wherein a hopper is secured to the free end of said second auger tube and said first and second auger tubes each contain augers which are operatively connected together within said junction member, said second auger being thereby operated by operation of said first auger.

7. An auger type conveyor having a tiltable section, said conveyor comprising a first auger tube, a second auger tube spaced from one end of said first auger tube, a hopper fixed to the other end of said second auger tube, a rigid junction box secured to said first auger tube, a lid for said junction box, said junction box and said lid being adapted to substantially enclose the space between said first and second auger tubes, said second auger tube being mounted on said junction member for pivotable movement about a substantially horizontal axis whereby said second auger tube is adapted to move from a substantially horizontal position to a substantially vertical position, augers contained within said first and second auger tubes and being operatively connected together within said junction box, springs for biasing said lid towards the uppermost portion of said second auger tube for directing said lid into close proximity with said second auger tube regardless of the pivoted position of said second tube, and means for assisting the pivotable movement of said second auger tube from a substantially horizontal position to a substantially vertical position.

8. The conveyor of claim 7 wherein the means for assisting the pivotal movement of said second auger tube comprises a counterbalance spring having one end connected to said first auger tube and the other end connected to said second auger tube and being adapted to bias said second auger tube towards said first auger tube.

9. The conveyor of claim 7 wherein means are provided for maintaining said second auger tube and said hopper in a substantially vertical position.

References Cited by the Examiner
UNITED STATES PATENTS

| | | | |
|---|---|---|---|
| 1,163,057 | 12/15 | Adams | 198—87 |
| 2,613,004 | 10/52 | Kane | 198—87 |

SAMUEL F. COLEMAN, *Acting Primary Examiner.*

WILLIAM B. LA BORDE, *Examiner.*